US010676550B2

(12) United States Patent
Desportes et al.

(10) Patent No.: US 10,676,550 B2
(45) Date of Patent: Jun. 9, 2020

(54) COPOLYMERS AND FILMS THEREOF

(71) Applicant: INEOS EUROPE AG, Vaud (CH)

(72) Inventors: Serge Desportes, Simiane-Collongue (FR); Imen Ghouila, Martigues (FR); Claudine Lalanne-Magne, Saint Mitre les Remparts (FR); Eric Osmont, Martigues (FR)

(73) Assignee: INEOS EUROPE AG, Vaud (CH)

( * ) Notice: Subject to any disclaimer, the term of this patent is extended or adjusted under 35 U.S.C. 154(b) by 15 days.

(21) Appl. No.: 15/742,552

(22) PCT Filed: Jul. 7, 2016

(86) PCT No.: PCT/EP2016/066166
§ 371 (c)(1),
(2) Date: Jan. 8, 2018

(87) PCT Pub. No.: WO2017/005867
PCT Pub. Date: Jan. 12, 2017

(65) Prior Publication Data
US 2018/0201705 A1 Jul. 19, 2018

(30) Foreign Application Priority Data
Jul. 9, 2015 (EP) .................................... 15176047

(51) Int. Cl.
C08F 210/16 (2006.01)
C08F 4/6592 (2006.01)
C08J 5/18 (2006.01)
C08F 4/659 (2006.01)

(52) U.S. Cl.
CPC ............ *C08F 210/16* (2013.01); *C08J 5/18* (2013.01); *C08F 4/65908* (2013.01); *C08F 4/65912* (2013.01); *C08F 4/65916* (2013.01); *C08F 2410/01* (2013.01); *C08F 2420/02* (2013.01); *C08J 2323/08* (2013.01)

(58) Field of Classification Search
CPC .......................... C08F 210/16; C08F 4/6592
See application file for complete search history.

(56) References Cited

U.S. PATENT DOCUMENTS

| 4,719,193 A | † | 1/1988 | Levine |
| 5,530,065 A | † | 6/1996 | Farley |
| 2003/0213938 A1 | * | 11/2003 | Farley ................. C08L 23/0815 252/500 |
| 2013/0115461 A1 | † | 5/2013 | Jan |

FOREIGN PATENT DOCUMENTS

| EP | 0 608 369 | 5/1997 |
| EP | 1 325 073 | 5/2007 |
| WO | WO 94/14855 | 7/1994 |
| WO | WO 94/26816 | 11/1994 |
| WO | WO 96/08521 | 3/1996 |
| WO | WO 2006/085051 | 8/2006 |
| WO | WO 2008/074689 | 6/2008 |

OTHER PUBLICATIONS

International Search Report for PCT/EP2016/066166, dated Oct. 7, 2016, 4 pages.
Written Opinion of the ISA for PCT/EP2016/066166, dated Oct. 7, 2016, 6 pages.
Fisher, "Advanced Sclairtech—A New Approach to Easy Processing Single Site Resins", *Processing Metallocene Polyolefins*, Oct. 19-20, 1999, 9 pages.
McAuley et al., On-Line Inference of Polymer Properties in an Industrial Polyethylene Reactor, AIChe Journal, vol. 37, No. 6, pp. 825-835, (Jun. 1991).†

\* cited by examiner
† cited by third party

*Primary Examiner* — Caixia Lu
(74) *Attorney, Agent, or Firm* — Nixon & Vanderhye P.C.

(57) ABSTRACT

Novel copolymers having a density (D) in the range 0.895-0.910 g/cm$^3$, a melt index $MI_2$ (2.16 kg, 190° C.) in the range of 0.01-6 g/10 min, a Compositional Distribution Branch Index (CDBI) in the range 55-85%, and a sealing initiation temperature (SIT) and density (D) satisfying the relationship SIT≤(A×D)−B wherein A is 800° C.×cm$^3$/g and B is 650° C., wherein the SIT (° C.) is determined on a 70 μm film at 0.5N/15 mm and D Is in units of g/cm$^3$ are disclosed. The copolymers may be suitably prepared by use of metallocene catalyst systems and may be used in film applications, in particular as sealing layers for packaging applications.

14 Claims, No Drawings

COPOLYMERS AND FILMS THEREOF

This application is the U.S. national phase of International Application No. PCT/EP2016/066166 filed Jul. 7, 2016 which designated the U.S. and claims priority to EP Patent Application No. 15176047.7 filed Jul. 9, 2015, the entire contents of each of which are hereby incorporated by reference.

The present invention relates to novel copolymers and in particular to novel copolymers of ethylene and alpha-olefins in particular to linear low density polyethylenes (LLDPE) and also to films produced from said copolymers.

In recent years there have been many advances in the production of polyolefin copolymers due to the introduction of metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions and narrow Short Chain Branching Distribution (SCBD).

Although certain properties of metallocene products are enhanced by narrow molecular weight distribution, difficulties are often encountered in the processing of these materials into useful articles and films relative to Ziegler produced materials. In addition, the uniform nature of the SCBD of metallocene produced materials does not readily permit certain structures to be obtained.

Recently a number of patents have published directed to the preparation of films based on low density polyethylenes prepared using metallocene catalyst compositions.

EP 608369 describes copolymers having a melt flow ratio ($I_{10}/I_2$) of ≥5.63 and a molecular weight distribution (Mw/Mn) satisfying the relationship Mw/Mn≤($I_{10}/I_2$)−4.63. The copolymers are described as elastic substantially linear olefin polymers having improved processability and having between 0.01 to 3 long chain branches per 1000 C atoms and show the unique characteristic wherein the $I_{10}/I_2$ is essentially independent of Mw/Mn.

WO 94/14855 discloses linear low density polyethylene (LLDPE) films prepared using a metallocene, alumoxane and a carrier. The metallocene component is typically a bis (cyclopentadienyl) zirconium complex exemplified by bis (n-butylcyclopentadienyl) zirconium dichloride and is used together with methyl alumoxane supported on silica. The LLDPE's are described in the patent as having a narrow Mw/Mn of 2.5-3.0, a melt flow ratio (MFR) of 15-25 and low zirconium residues.

WO 94/26816 also discloses films prepared from ethylene copolymers having a narrow composition distribution. The copolymers are also prepared from traditional metallocenes (eg bis (1-methyl, 3-n-butylcyclopentadienyl) zirconium dichloride and methylalumoxane deposited on silica) and are also characterised in the patent as having a narrow Mw/Mn values typically in the range 3-4 and in addition by a value of Mz/Mw of less than 2.0.

Our application WO 2006/085051 describes copolymers prepared by use of supported monocyclopentadienyl metallocene complexes activated by borates suitable for use in film applications. The copolymers have broader molecular weight distributions (3.5 to 4.5) and low or moderate amounts of long chain branching (LCB) and are advantageous for producing films having an excellent balance of processing, optical and mechanical properties. Exemplified copolymers are those with density of 0.918/0.919 g/cm³ and melt index ($MI_2$) of 0.95 to 1.3.

WO 2008/074689 describes similar copolymers prepared from the same supported catalyst systems but with a more balanced processability. The copolymers are characterised by the relationship between the Dow Rheology Index (DRI), melt elastic modulus and melt index and again the copolymers are exemplified with densities of 0.918-0.921 g/cm³ and melt indices ($MI_2$) in the range 1.1 to 1.3. The copolymers are also advantageous for producing films having an excellent balance of processing, optical and mechanical properties.

Polyethylenes are widely used for flexible packaging applications due to their ability to form seals at low temperature. The lower the temperature the faster the seal is formed and the packaging line may therefore be run faster resulting in overall reduced conversion costs. An important parameter for selecting a suitable polymer is therefore the sealing initiation temperature (SIT) of the polymer selected as the sealing layer in the packaging.

The sealing initiation temperature (SIT), typically determined for example at 0.5N/15 mm, is defined as the minimum sealing temperature required to form a seal with a strength above 0.5N for a film specimen of 15 mm width. As the sealing process is mainly governed by the melting and diffusion of the sealing layers, the lower the crystallinity, which is determined by density, then the lower the SIT.

Traditionally polymers with density in the range 0.920-0.925 g/cm³ have been preferred for this application having a SIT ranging between 104 to 115° C. Linear low density polyethylenes (LLDPE) prepared using metallocene catalyst systems typically have a SIT in the range 95-100° C. Ultra low or very low density polyethylenes (VLDPEs) may have a SIT as low as about 72° C.

WO 96/08521 describes metallocene-catalysed gas phase polymerization process producing polymers having very low densities in the range 0.85-0.89 g/cc and a Composition Distribution Branching Index (CDBI)>60%. The metallocenes are unbridged bis(cyclopentadienyl) metallocene complexes. The polymers are suitable for film applications but no details of film properties are reported.

EP 1325073 describes metallocene-produced very low density polyethylenes (VLDPE) having densities in the range 0.905-0.915 g/cm³ and CDBI in the range 55-70% by weight. The VLDPEs are prepared in the gas phase also using unbridged bis(cyclopentadienyl) metallocene complexes and have a relatively narrow molecular weight distribution as expressed by a Mw/Mn in the range 2-3 and a Mz/Mw less than 2. The polymers are suitable for film applications reporting improved hot tack strength at low initiation temperatures.

An article in Processing Metallocene Polyolefins Paper 13, 1 Jan. 1999, Pgs 1-8 compares the processabilities and sealing performance of films derived from resins prepared from single site catalyst systems. SITs of between 64° C. and 73° C. are reported for resins having densities ≤0.910 g/cm³.

We have now developed novel linear low density polymers having a SIT below 72° C. using supported monocyclopentadienyl metallocene systems as described in the aforementioned WO 2006/085051 and WO 2008/074689. The novel copolymers are preferably produced in the gas phase.

Surprisingly said copolymers exhibit an unexpected relationship between density and SIT at lower densities and may advantageously be used as sealing layers for packaging applications.

In addition the novel copolymers of the present invention exhibit CDBIs in the range 55-85% typical of resins based on metallocene catalyst systems but much higher than that observed with traditional Ziegler Natta catalyst systems or resins produced by single site catalysts performed in the solution phase thereby providing the advantages of lower SITs but with improved processability.

Thus according to a first aspect of the present invention there is provided a copolymer of ethylene and an alpha-olefin, said copolymer having (a) a density (D) in the range 0.895-0.910 g/cm$^3$,
(b) a melt index MI$_2$ (2.16 kg, 190° C.) in the range of 0.01-6 g/10 min,
(c) a Compositional Distribution Branch Index (CDBI) in the range 55-85%, and
(d) a sealing initiation temperature (SIT) and density (D) satisfying the relationship SIT≤($A$×$D$)−$B$ wherein $A$ is 800° C.×cm$^3$/g and $B$ is 650° C.

wherein the SIT (° C.) is determined on a 70 μm film at 0.5N/15 mm and D is in units of g/cm$^3$.

The copolymers of the present invention exhibit a CDBI preferably in the range 65-85%.

The preferred relationship between the sealing initiation temperature (SIT) and density (D) is when A is 1200° C.×cm$^3$/g and B is 1014° C. and most preferred when A is 1700° C.×cm$^3$/g and B is 1469° C.

Preferred copolymers have a density (D) in the range 0.900 to 0.910 g/cm$^3$, and most preferably in the range 0.901 to 0.907 g/cm$^3$.

Preferred copolymers have a melt index in the range 0.05 to 5 g/10 min and most preferably in the range 1.2 to 1.6 g/10 min.

The copolymers preferably have a sealing initiation temperature (SIT) at 0.5N on a 15 mm film of <72° C.

The preferred SIT is <70° C. and most preferably <65° C.

The copolymers exhibit a Crystallizable Species Fraction below 55° C. (CSF55)≥12% and preferably ≥15%.

The copolymers of the present invention have a molecular weight distribution (Mw/Mn) greater than 3 and less than 5, preferably greater than 3.2 and less than 4.5 and most preferably greater than 3.4 and less than 4.5.

The copolymers of the present invention also have a value for Mz/Mn in the range 2.0 to 4.0, preferably in the range 2.2 to 3.5 and most preferably in the range 2.32 to 3.0.

Preferred alpha-olefins are those having C4-C12 carbon atoms. Most preferred alpha-olefins are 1-butene, 1-hexene, 4-methyl-1-pentene and 1-octene.

The preferred alpha-olefin is 1-hexene.

The novel copolymers of the present invention may suitably be prepared by use of a metallocene catalyst system comprising, preferably a monocylcopentadienyl metallocene complex having a 'constrained geometry' configuration together with a suitable activator.

Examples of monocyclopentadienyl or substituted monocyclopentadienyl complexes suitable for use in the present invention are described in EP 416815, EP 418044. EP 420436 and EP 551277.

Suitable complexes may be represented by the general formula:

CpMX$_n$ wherein Cp is a single cyclopentadienyl or substituted cyclopentadienyl group optionally covalently bonded to M through a substituent, M is a Group VIA metal bound in a η$^5$ bonding mode to the cyclopentadienyl or substituted cyclopentadienyl group. X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

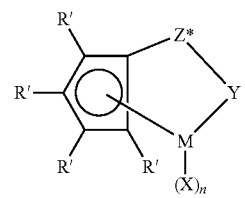

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SIR*$_2$, CR*$_2$CR*$_2$, CR*═CR*, CR*$_2$SiR*$_2$, or GeR*2, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-η$^5$-cyclopentadienyl) silanetitanium dichloride and (2-methoxyphenylamido) dimethyl (tetramethyl-η$^5$-cyclopentadienyl) silanetitanium dichloride.

Particularly preferred metallocene complexes for use in the preparation of the copolymers of the present invention may be represented by the general formula:

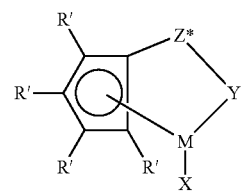

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral η⁴ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*₂, CR*₂, SiR*₂SiR*₂, CR*₂CR*₂, CR*=CR*, CR*₂SiR*₂, or
GeR*₂, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-η⁴-1,4-diphenyl-1,3-butadiene, s-trans-η⁴-3-methyl-1,3-pentadiene; s-trans-η⁴-2,4-hexadiene; s-trans-η⁴-1,3-pentadiene; s-trans-η⁴-1,4-ditolyl-1,3-butadiene; s-trans-η⁴-1,4-bis(trimethylsilyl)-1,3-butadiene; s-cis-η⁴-3-methyl-1,3-pentadiene; s-cis-η⁴-1,4-dibenzyl-1,3-butadiene; s-cis-η⁴-1,3-pentadiene; s-cis-η⁴-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire C₅R'₄ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R″)— or —P(R″)— wherein R″ is C₁₋₁₀ hydrocarbyl.

Most preferred complexes are amidosilane—or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-η⁵-cyclopentadienyl) dimethyl silanetitanium-η⁴-1,3-pentadiene.

Suitable cocatalysts for use in the preparation of the novel copolymers of the present invention are those typically used with the aforementioned metallocene complexes.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

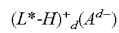

wherein:—

L* is a neutral Lewis base (L*-H)⁺_d is a Bronsted acid

A^{d−} is a non-coordinating compatible anion having a charge of d⁻, and d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations eg, triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl) borate
tri (p-tolyl)(hydroxyphenyl) borate
tris (pentafluorophenyl)(hydroxyphenyl) borate
tris (pentafluorophenyl)(4-hydroxyphenyl) borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogenated tallow alkyl) methylammonium and similar.

Particular preferred cocatalysts of this type are alkylammonium tris(pentafluorophenyl) 4-(hydroxyphenyl) borates. A particularly preferred cocatalyst is bis(hydrogenated tallow alkyl) methyl ammonium tris (pentafluorophenyl) (4-hydroxyphenyl) borate.

With respect to this type of cocatalyst, a preferred compound is the reaction product of an alkylammonium tris (pentaflurophenyl)-4-(hydroxyphenyl) borate and an organometallic compound, for example triethylaluminium or an aluminoxane such as tetraisobutylaluminoxane.

The catalysts used to prepare the novel copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica. Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Particularly suitable catalysts for use in the preparation of the copolymers of the present invention are metallocene complexes which have been treated with polymerisable monomers. Our earlier applications WO 04/020487 and WO 05/019275 describe supported catalyst compositions wherein a polymerisable monomer is used in the catalyst preparation.

Polymerisable monomers suitable for use in this aspect of the present invention include ethylene, propylene, 1-butene, 1-hexene, I-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene and 1-hexene.

The preferred polymerisable monomer is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively the complex may be pretreated with the polymerisable monomer.

The novel copolymers of the present invention may suitably be prepared in processes performed in either the slurry or the gas phase.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

The novel copolymers are most suitably prepared in a gas phase process.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Preferred gas phase processes are those operating in a fluidised bed. Particularly preferred gas phase processes are those operating in "condensed mode" as described in EP 89691 and EP 699213 the latter being a particularly preferred process.

By "condensed mode" is meant the "process of purposefully introducing a recycle stream having a liquid and a gas phase into a reactor such that the weight percent of liquid based on the total weight of the recycle stream is typically greater than about 2.0 weight percent".

The novel copolymers of the present invention may be suitably prepared by the copolymerisation of ethylene with alpha-olefins.

The preferred alpha-olefins are 1-butene, 1-hexene, 4-methyl-1-pentene and 1-octene. The most preferred alpha-olefin is 1-hexene.

Thus according to another aspect of the present invention there is provided a method for the preparation of copolymers of ethylene and alpha-olefins having
(a) a density (D) in the range 0.895-0.910 g/cm$^3$,
(b) a melt index MI$_2$ (2.16 kg, 190° C.) in the range of 0.01-6 g/10 min,
(c) a Compositional Distribution Branch Index (CDBI) in the range 55-85%, and
(d) a sealing initiation temperature (SIT) and density (D) satisfying the relationship SIT≤(A×D)−B wherein A is 800° C.×cm$^3$/g and B is 650° C.

wherein the SIT (° C.) is determined on a 70 μm film at 0.5N/15 mm and D is in units of g/cm$^3$, said method comprising copolymerising ethylene and said alpha olefins in the presence of a catalyst system as hereinbefore described.

Preferred copolymers have a density (D) in the range 0.900 to 0.910 g/cm$^3$, and most preferably in the range 0.901 to 0.907 g/cm$^3$.

Preferred copolymers have a melt index in the range 0.05 to 5 g/10 min and most preferably in the range 1.2 to 1.6 g/10 min.

The preferred relationship between the sealing initiation temperature (SIT) and density (D) is when A is 1200° C.×cm$^3$/g and B is 1014° C. and most preferred when A is 1700° C.×cm$^3$/g and B is 1469° C.

The novel copolymers are particularly suitable for the production of films using traditional methods well known in the art.

Thus according to another aspect of the present invention there is provided a film comprising a copolymer of ethylene and an alpha-olefin having
(a) a density (D) in the range 0.895-0.910 g/cm$^3$,
(b) a melt index MI$_2$ (2.16 kg, 190° C.) in the range of 0.01-6 g/10 min,
(c) a Compositional Distribution Branch Index (CDBI) in the range 55-85%, and
(d) a sealing initiation temperature (SIT) and density (D) satisfying the relationship SIT≤(A×D)−B wherein A is 800° C.×cm$^3$/g and B is 650° C.

wherein the SIT (° C.) is determined on a 70 μm film at 0.5N/15 mm and D is in units of g/cm$^3$.

Preferred copolymers have a density (D) in the range 0.900 to 0.910 g/cm$^3$, and most preferably in the range 0.901 to 0.907 g/cm$^3$.

Preferred copolymers have a melt index in the range 0.05 to 5 g/10 min and most preferably in the range 1.2 to 1.6 g/10 min.

The preferred relationship between the sealing initiation temperature (SIT) and density (D) is when A is 1200° C.×cm³/g and B is 1014° C. and most preferred when A is 1700° C.×cm³/g and B is 1469° C.

The films of the present invention also exhibit improved hot tack strength at low sealing temperature. The temperature at which the hot tack strength is equal to 3 N is ≤95° C., preferably ≤92° C. and most preferably ≤90° C.

The polymer powder prepared from the copolymers of the present invention show unexpected excellent flowability resulting in advantages downstream from the reactor. The flowability may be expressed in terms of the compressability of the polymer powders. The compressability is a qualitative index of the powder flowability downstream of the reactor and may be used to highlight potential issues or problems that may occur in the powder flow.

Polymer powders showing compressabilities of about 20% may give rise to significant problems downstream of the reactor and hence it is desirable to maintain compressabilities below 18% and preferably below 16%.

The polymer powder prepared from the copolymers of the invention show low powder compressability unexpected for their low densities Accordingly the copolymers of the present invention exhibit a powder compressability (C) as follows:

$$\% \; C < (-A \times D) + B$$

wherein D is the density in units of kg/m³, and A is 1 and B is 928.

Preferably A is 0.75 and B is 698 and most preferably A is 0.5 and B is 468.

The films may suitably comprise a multilayer film comprising a number of layers at least one of which comprises copolymers as hereinbefore described.

The films may suitably be used as sealing layers for packaging applications.

The present invention will now be further illustrated with reference to the following examples:

EXAMPLES 1 AND 2

Catalyst Preparation
Treatment of Silica with Triethylaluminium

Under continuous agitation, 2172 L of isohexane and 434.5 kg of silica SY2408 (available from W.R. Grace), were added to a reactor. (The silica was previously calcined under nitrogen to reach a level of hydroxyl groups of 1.5 mol/kg). 21.3 kg of a Statsafe 2500 (supplied by Innospec) solution in iso-hexane (2 g/L) was then added and the mixture was stirred for 15 minutes. 721 kg of a 12 wt % triethylaluminium (TEA) solution in isohexane was then slowly added over 1 hour and the mixture was stirred for 1 hour further at 30° C.

The slurry was filtered and thoroughly washed with isohexane before being transferred to a dryer. 21.3 kg of Statsafe2500 in isohexane (2 g/l) was added and the mixture was finally dried at 60° C. under vacuum.

The aluminium content of the solid was 3.62 wt %.
Preparation of Catalyst Component (1)

To 404.6 kg of a 10.6 wt % solution of [NH)-Me(C$_{18-22}$H$_{37-45}$)$_2$][B(C$_6$F$_5$)$_3$(p-OHC$_6$H$_4$)] in toluene were added over 15 minutes 35.7 kg of 12 wt % TEA solution in isohexane. The mixture was further stirred for 15 minutes to yield a solution of catalyst component 1.

Preparation of a Mixture of (C$_5$Me$_4$SiMe$_2$N$^t$Bu)Ti(η$^4$-1,3-Pentadiene) with 1-Hexene 130.2 kg of a 9.87 wt % solution of (C$_5$Me$_4$SiMe$_2$N$^t$Bu)Ti(η$^4$-1,3-pentadiene) in heptane and 83 kg of 1-hexene were mixed together during 15 min.

Preparation of the Supported Catalyst 483.5 kg of the above prepared silica/TEA was introduced into a reactor. The above prepared solution of catalyst component 1 was fed to the reactor over 60 min and the mixture was then stirred for further 30 minutes.

The contents of the reactor was then cooled to 15° C. and the above prepared solution of (C$_5$Me$_4$SiMe$_2$N$^t$Bu)Ti(η$^4$-1,3-pentadiene) and 1-hexene was fed over a period of 30 minutes, and then the mixture was further stirred for 40 minutes.

12.8 kg of a Statsafe2500 solution in isohexane (200 g/l) was then added and the mixture was dried at 60° C. during 13 hours until the residual solvent content in the catalyst was <1 wt %. Analysis of the resulting free flowing powder showed the titanium content to be 56 μmol/g, the boron content to be 59 μmol/g and the aluminium content to be 2.9 wt %.

EXAMPLE 3 (COMPARATIVE)

Example 3 is an ethylene-octene copolymer commercialized by *Borealis* under the reference QUEO 0201 produced using a metallocene catalyst in a solution polymerisation process.

EXAMPLE 4 (COMPARATIVE)

Example 4 is an ethylene-octene copolymer commercialized by *Borealis* under the reference QUEO 1001 produced using a metallocene catalyst in a solution polymerisation process.

EXAMPLE 5 (COMPARATIVE)

Example 5 is an ethylene-hexene copolymer of density 0.918 g/cm³ manufactured according to the teaching parameters in the aforementioned WO 2008/074689.

Polymerization

Polymerizations using the catalysts prepared in examples 1 and 2 were carried out continuously using a fluidized bed gas phase reactor of 74 cm diameter, with a vertical cylindrical section of 7 m. Polymerization conditions used are shown in Table 1 as follows

TABLE 1

| Example | 1 | 2 |
|---|---|---|
| Production Rate Kg/h | 187 | 188 |
| Reaction temp (° C.) | 70 | 72 |
| Reaction pressure (barg) | 20 | 20 |
| C2 partial pressure (bar) | 11.6 | 12.3 |
| H2 to C2 pressure ratio (mol/mol) | 0.0038 | 0.0036 |
| C6 partial pressure (bar) | 0.069 | 0.067 |
| C5 partial pressure (bar) | 1.6 | 1.7 |
| Residence time (hrs) | 3.3 | 4 |
| Condensation rate (wt %) | 0 | 0 |

Product Characteristics

The product characteristics are shown below in Table 2.

TABLE 2

|  | Example 1 | Example 2 | CE3 | CE4 | CE5 |
|---|---|---|---|---|---|
| Density (g/cm$^3$) | 0.9013 | 0.9063 | 0.9007 | 0.9097 | 0.918 |
| MI$_2$ (2.16 kg/190° C.) | 1.13 | 1.15 | 1.26 | 1.1 | 1.3 |
| CDBI (%) | 69.8 | 83.3 | 88.5 | 94.0 | 68.2 |
| (A × D) − B* | 71.04 | 75.04 | 70.56 | 77.76 | 84.4 |
| SIT at 0.5N (° C.) | 60 | 71 | 72 | 79 | 92 |
| Mn (kDa) | 32.2 | 30.4 | 30.5 | 27.2 | 29.0 |
| Mw (kDa) | 117.3 | 115.2 | 92.6 | 89.6 | 117 |
| Mz (kDa) | 265.3 | 261.2 | 188.3 | 199.0 | 276 |
| Mw/Mn | 3.6 | 3.8 | 3.0 | 3.3 | 3.8 |
| Mz/Mn | 2.3 | 2.3 | 2.0 | 2.2 | 2.4 |
| Peak melting temp ° C. | 86.5/114.7 | 91.9/114.9 | 95.4 | 104.8 | 102/117.7/121.4 |
| CSF55 (%) | 17.4 | 11.4 | 11.1 | 3.9 | 0.8 |
| Maximum Hot tack strength (N) | 10.9 | 11.8 | 10.0 | 9.8 | 11.3 |
| Temperature with Hot tack strength of 3N (° C.) | 87 | 89 | 99 | 107 | 124 |
| Powder compressability (%) | 14.8 | 10.2 |  |  |  |

*A = 800 and B = 650.

Melt index (190/2.16) was measured according to ISO 1133. Density was measured using a density column according to ISO 1872/1 method except that the melt index extrudates were not annealed but left to cool on a sheet of polymeric material for 30 minutes.

Gel Permeation Chromatography Analysis for Molecular Weight Distribution Determination Apparent molecular weight distribution and associated averages, uncorrected for long chain branching, were determined by Gel Permeation Chromatography using a GPC IR device from Polymer ChAR (, with 3 TSK GMHh r-H (S) columns from TOSOH CORPORATION and a IR5 detector a infrared detector supplied by Polymer ChAR. The solvent used was 1,2,4 Trichlorobenzene at 160° C., which is stabilised with BHT, of 0.1 g/litre concentrationer. Polymer solutions of 1.0 g/litre concentration were prepared at 160° C. for one hour with stirring only at the last 30 minutes. The nominal injection volume was set at 200 µl and the nominal flow rate was 1 ml/min.

A relative calibration was constructed using 13 narrow molecular weight linear polystyrene standards:

| PS Standard | Molecular Weight |
|---|---|
| 1 | 3 900 000 |
| 2 | 1 950 000 |
| 3 | 1 160 000 |
| 4 | 9952 600 |
| 5 | 488 400 |
| 6 | 195 900 |
| 7 | 70 950 |
| 8 | 49 170 |
| 9 | 30 230 |
| 10 | 19 760 |
| 11 | 10 680 |
| 12 | 1 930 |

The elution volume, V, was recorded for each PS standards. The PS molecular weight was then converted to PE equivalent using the following Mark Houwink parameters $k_{ps}=1.75\times10^{-4}$, $\alpha_{ps}=0.67$, $k_{pe}=5.1\times10^{-4}$, $\alpha_{pe}=0.706$. The calibration curve $Mw_{PE}=f(V)$ was then fitted with a first order linear equation. Number average molecular weight (Mn), weight average molecular weight (Mw), z-average molecular weight (Mz) are computed using the formula given the text book "Properties of Polymers correlation with chemical structure" by D. W. Van Krevelen, Elsevier Publishing Company, Amsterdam, 1972. All the calculations are done with GPC one software from Polymer Char.

The very low molecular weight fractions (below 600 Daltons) were routinely excluded in the calculation of number average molecular weight, Mn, and hence the polymer polydispersity, Mw/Mn, in order to improve integration at the low end of the molecular weight curve, leading to a better reproducibility and repeatability in the extraction and calculation these parameters.

Peak Melting temperature was determined by differential scanning calorimetry using a Perkin Elmer Diamond model following the methodology outlined in ASTM D3417 except that the first heating was carried out at 20° C./mn. The peak temperature is taken as the temperature correspond to a maximum heat flow observed during the second heating of the polymer at 10° C./mn. In case of several peaks during melting are observed, for each maximum a peak melting temperature is recorded.

Composition distribution breadth index ("CDBI") is defined as the weight percent of the copolymer molecules having a comonomer content within 50% of the median total molar comonomer content. The CDBI is determined by Temperature Rising Elution Fraction (TREF). TREF experiments analysis was conducted in a commercial CRYSTAF model 200 instrument from Polymer Char. Approximately 60 mg of polymer is dissolved at 150° C. for 60 minutes in 25 mL of 1,2,4 Trichlorobenzene stabilised with BHT, of 0.1 g/litre. 1.8 ml of the solution is then transferred into the column and allowed to equilibrate for approximately 45 minutes at 95° C. The polymer solution is then cooled to 35° C. using a cooling rate of 0.5° C./min. After 20 mn stabilization, TCB is eluted through the column at 0.5 ml/mn at 35° C. The polymer concentration is measured at the column outlet by an Infra Red detector. After the soluble species is fully eluted, the column temperature is increased at 1° C./mn until 120° C. After completion of the elution, CDBI is calculated from the elution profile.

Crystallizable Species Fraction below 55° C. ("CSF55") is defined as the weight percentage of copolymers eluted between 35 and 55° C. over the eluted amount between 35 to 120° C. CSF55 is determined by TREF under the same conditions used for CDBI determination.

Powder Compressability

The compressibility factor C (%) was determined on a Flow Rate Indicizer supplied by Johanson Innovations Inc, 102 Cross Street Suite #110 San Luis Obispo, Calif. 93401. The Flow Rate Indicizer equipment enables to assess qualitatively the powder flowability due to the compressibility factor being defined as:

$$C\ (\%) = \frac{BDI - FDI}{BDI} * 100$$

where: FDI: Feed Density Index, which is the powder bulk density at silo feed, i.e. close to Settled Bulk Density.

BDI: Bin Density Index, which the bulk density of the powder submitted to 500 standard impacts according to NFT 51-042.

Both Density Indexes were determined at 60° C.

Film Characteristics

The films were extruded on a blown film line under the following conditions

| Supplier | Dr Collin |
|---|---|
| Model | Extruder M type 180/600 |
| Screw diameter | 45 mm |
| Screw L/D Ratio | 25D |
| Die diameter | 100 mm |
| Die gap | 1.2 mm |
| Temperature Profile | 190/200/205/210/215/215/220/220° C. |
| Output | 15 kg/h |
| Blow-up ratio | 2:1 |
| Frostline height | 330 mm |
| Film thickness | 70 μm |

The sealing initiation temperature (SIT) was calculated from the sealing strength—sealing temperature curve for a sealing strength of 0.5 N/15 mm. Seal strength is determined by cutting two superimposed film specimen of 130 mm×150 mm×70 μm in transversal direction (TD) using the film cutting template. To avoid the film sticking to the hot plate, the test specimen are placed between two layers of Mylar film (25 μm) then put between the hot jaws of the sealing machine from OTTO BRUGGER with the transversal direction of the film along the length of the jaws. The films are sealing at the set temperatures corresponding to 10° C. step between 50 and 140° C. The pressure is 2 bars and sealing time is 0.5 s. Three 15 mm width strips are cut in the Machine Direction and conditioned for 24 h at 23° C. at 50% relative humidity. The specimens are peeled in a tensile machine at 200 mm/mn with a initial distance between the two jaws of 50 mm. The sealing strength is recorded at specimen breakage and average across the three specimens.

The temperature with a hottack strength of 3N and maximum hottack strength were calculated from the hottack strength—sealing temperature curve and corresponds to the lowest sealing temperature for which the hottack strength is superior or equal to 3 N and highest strength recorded between 50 to 140° C. respectively.

The hottack strength is determined with a Topwave Hot Tack Tester on 25 mm-width film specimens in the TD direction. The film specimens are back-taped with a thermoresistant adhesive tape (reference 51588 from VAN ROLL ISOLA). The Hot Tack Tester settings were:

Seal Pressure: 0.14 N/mm2
Seal Time: 0.4 sec
Cool Time: 0.3 sec
Peel Speed: 150 mm/sec
Force Range: 100N
Seal temperature: 80-90-95-100-105-120-125-130-140-150-160-170-180°

The invention claimed is:

1. A copolymer of ethylene and an alpha-olefin, said copolymer having
    (a) a density (D) in the range 0.895-0.910 g/cm$^3$,
    (b) a melt index MI$_2$ (2.16 kg, 190° C.) in the range of 0.01-6 g/10 min,
    (c) a Compositional Distribution Branch Index (CDBI) in the range 55-85%, and
    (d) a sealing initiation temperature (SIT) and density (D) satisfying the relationship $$SIT \leq (A \times D) - B$$

wherein A is 1700° C.×cm$^3$/g and B is 1469° C., and wherein the SIT (° C.) is determined on a 70 μm film at 0.5N/15 mm and D is in units of g/cm$^3$, and
    (e) a Crystallizable Species Fraction below 55° C. (CSF55)≥12%.

2. A copolymer according to claim 1 having a Compositional Distribution Branch Index (CDBI) in the range 65-85%.

3. A copolymer according to claim 1 having a density in the range 0.901-0.907 g/cm$^3$.

4. A copolymer according to claim 1 having a melt index MI$_2$ (2.16 kg, 190° C.) in the range of 0.05-5 g/10 min.

5. A copolymer according to claim 1 having a sealing initiation temperature (SIT)<72° C.

6. A copolymer according to claim 1 having a molecular weight distribution (Mw/Mn) greater than 3.4 and less than 4.5.

7. A copolymer according to claim 1 wherein the alpha-olefin is 1-hexene.

8. A copolymer according to claim 1 prepared in the presence a metallocene catalyst system.

9. A copolymer according to claim 8 wherein the metallocene catalyst system comprises a monocyclopentadienyl metallocene complex.

10. A copolymer according to claim 1 exhibiting a powder compressability (C) as follows:

$$\% C < (-A' \times D) + B'$$

wherein D is the density in kg/m$^3$ and A'=1 and B'=928.

11. A copolymer according to claim 1 exhibiting a powder compressability (C) as follows:

$$\% C < (-A \times D) + B'$$

wherein D is the density in kg/m$^3$ and wherein A'=0.5 and B'=468.

12. A copolymer according to claim 1 having a Compositional Distribution Branch Index (CDBI) in the range 65-85%.

13. A copolymer according to claim 1 having a sealing initiation temperature (SIT)<65° C.

14. A copolymer according to claim 1 having a Crystallizable Species Fraction below 55° C. (CSF55)≥15%.

* * * * *